July 7, 1936.     H. C. EDWARDS     2,047,061
VALVE ACTUATING MECHANISM
Filed Oct. 10, 1931
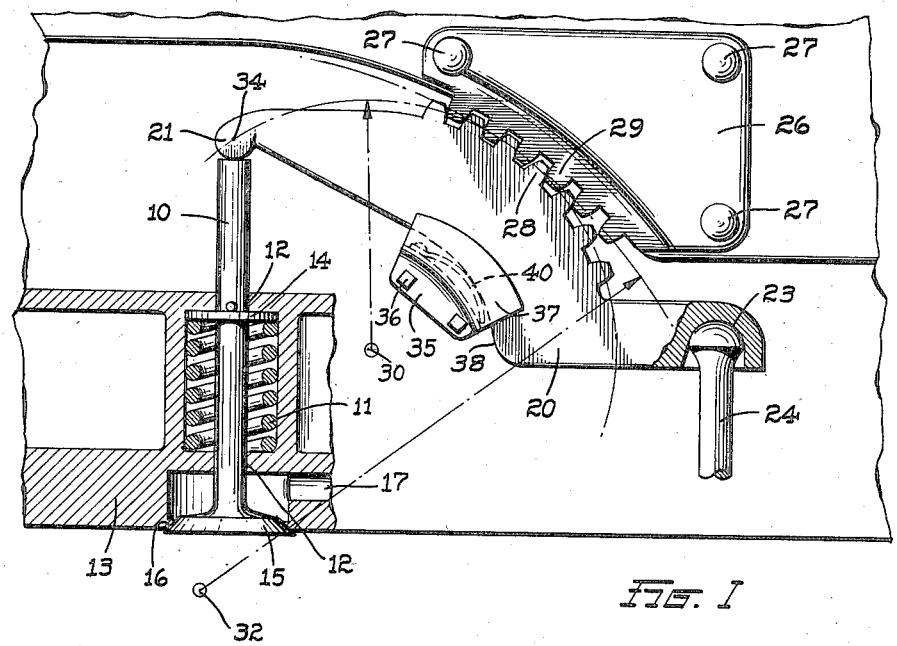
Fig. 1
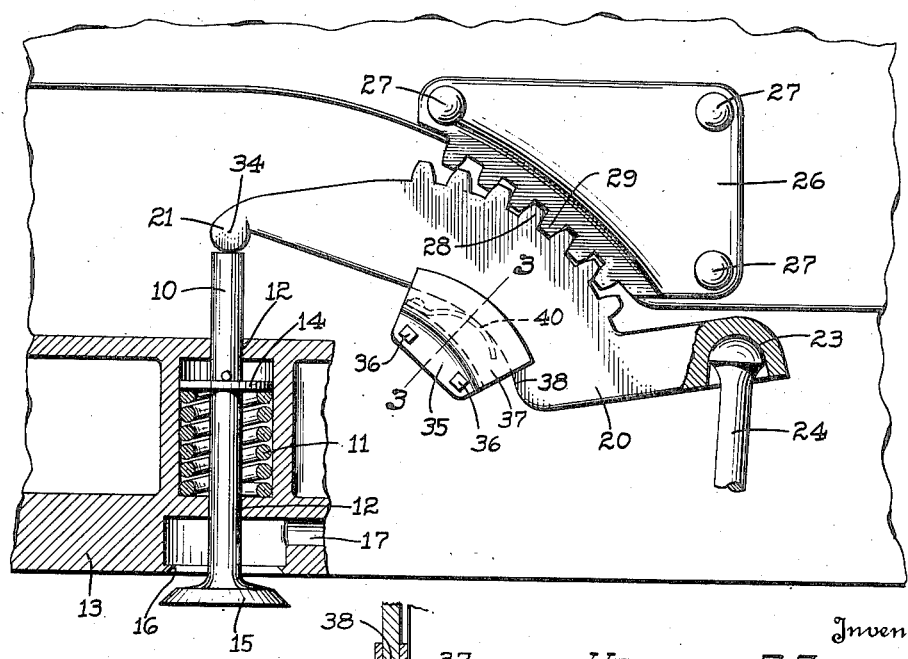
Fig. 2
Fig. 3
Inventor
HERBERT C. EDWARDS Patented July 7, 1936

2,047,061

UNITED STATES PATENT OFFICE 2,047,061

VALVE ACTUATING MECHANISM

Herbert C. Edwards, Detroit, Mich., assignor to Packard Motor Car Company, Detroit, Mich., a corporation of Michigan Application October 10, 1931, Serial No. 568,193

6 Claims. (Cl. 123—90)

This invention relates to valve actuating mechanism and is particularly concerned with the actuation of poppet valves and the like which are constrained to move in a straight line.

It is an object of the invention to provide means having rolling engagement with the valve stem or other element movable therewith for actuating the valve whereby sliding engagement between the relatively moving parts may be substantially eliminated and the resultant wear due to friction avoided.

It is a feature of the invention that in imparting movement to the valve stem or other element constrained to rectilinear motion, the principle of hypocycloidal action in which the diameter of the rolling circle is one half that of the fixed circle within which it rolls is employed, since the locus of a point on the rolling circle is a straight line. Thus, by providing a fixed surface having a given radius of curvature and an element having an arcuate portion of half that radius rolling on the fixed surface, any point on the rolling element lying on its curved surface or an extension thereof will execute linear movement and may thus be employed to impart substantially linear movement to the valve stem or associated elements.

It is a more specific object of the invention to provide means for engaging and actuating a poppet valve comprising an element provided with a curved surface, or the equivalent thereof, arranged to rock on a second fixed curved surface, the radius of curvature of the fixed curved surface being substantially twice that of the curved surface formed on the rocking element, the rocking element being provided with a further valve stem engaging surface having a relatively slight radius of curvature, the center of which is located on an extension of its first named curved surface. By proper selection of the radii of the several curved surfaces and the relative disposition of the several elements with respect to the path of movement of the valve stem, the rocking element may engage the valve stem with substantially pure rolling action and side thrust on the stem as well as wear due to friction between the engaged parts can be eliminated.

Further objects and features of the invention will be apparent from the following specification taken in connection with the accompanying drawing, in which:

Figure 1 is a view partly in section illustrating the application of the principles of the invention to the actuating of a poppet valve;

Figure 2 is a corresponding view in which the parts occupy a different position; and Figure 3 is a section on the line 3—3 of Figure 2.

Referring now more specifically to the drawing, it will be observed that the reference numeral 10 indicates the stem of a poppet valve of conventional type which is supported for rectilinear sliding movement in guide apertures 12 formed in a frame 13 which may comprise the cylinder head of an internal combustion engine, a valve box, or other suitable support for the valve. The head 15 of the valve is arranged to engage a valve seat 16 formed in the frame to close the passage 17 for preventing flow of fluid therein. A suitable spring 11 acting between the frame 13 and the collar 14 which constitutes an abutment on the valve stem urges the valve normally to closed position.

A rocking element 20 provided with a valve engaging portion 21 adjacent one end thereof and a seat 23 for engagement with a push rod 24 adjacent the other end thereof serves to thrust the valve stem downwardly as shown in Figure 1 to displace the valve head 15 from the seat 16 in the conventional manner. The member 20 is arranged to rock in engagement with a fixed member 26, the latter being secured to any convenient portion of the frame by bolts or rivets 27. It will be understood that in the application of this invention to the actuation of valves for internal combustion engines, the fixed member 26 may be secured to the cylinder head or the rocker box associated therewith.

In the embodiment of the invention shown in the drawing, the members 20 and 26 are illustrated as provided with cooperating toothed surfaces numbered 28 and 29, respectively. The center of the pitch circle of the toothed surface 28 is indicated at 30 and the center of the pitch circle for the toothed surface 29 is indicated at 32, it being noted that the radii of these pitch circles are in the ratio of 1 to 2. Thus, when the push rod 24 is moved upwardly from the position which it occupies in Figure 1 of the drawing, the member 20 will rock on the fixed member 26 and the valve 10 will be depressed to substantially the position shown in Figure 2 of the drawing.

It will be appreciated that the coacting members 20 and 26 need not be provided with teeth, the provision of arcuate engaging surfaces on these members having their radii of curvature corresponding with the radii of their pitch circles as shown in the drawing serving to actuate the valve stem in the manner intended.

Referring now to the valve engaging portion 21 of the member 20, it will be observed that this portion comprises a substantially cylindrical surface in direct engagement with the valve stem 10, the axis or center of this surface being located at 34 on an extension of the pitch circle of the toothed portion 28 of the member 20. The radius of this cylindrical surface is so chosen that as the valve is depressed to open the passage 17 the locus of the point of engagement between the portion 21 on the member 20 and the stem is approximately a line connecting the points 34 and 32, it being appreciated that the rolling nature of the engagement between the member 20 and the valve stem 10 will result in a gradual shifting of the point of contact to the left as the valve stem is depressed.

By reason of the fact that the axis 34 is located substantially on an extension of the pitch circle of the toothed portion 28 of the member 20, this axis 34 corresponds to a point on a circle rolling within a fixed circle, the radius of the latter being twice that of the former and thus any point on the axis 34 will move in a straight line. In this manner the side thrust on the valve stem is substantially eliminated and approximately pure rolling action is obtained between the member 20 and the valve stem at their point of engagement.

For convenience, it may be necessary to support the rocker 20 so that the push rod may be removed without disturbing the remaining elements. This support may consist of a bracket 35 bolted or riveted at 36 to the frame 13 and provided with flanges 37 extending on either side of the member 20 to prevent lateral shifting of this member. It is, of course, necessary in order to accommodate the slight rocking movement of the member 20 that the main portion of the bracket 35 be spaced from the lower surface 38 of the member 20, a flat spring 40 secured to the bracket 35 intermediate the flanges 37 and beneath the surface 38 being preferably provided to maintain the toothed surfaces 28 and 29 in engagement in the event the push rod 24 is removed.

It will be understood that the specific arrangement of the valve actuating mechanism described herein is designed to facilitate an understanding of the principles of the invention and that such changes and alterations are contemplated as fall within the spirit and scope of the appended claims.

Having thus described the invention, what is claimed as new and desired to be secured by Letters Patent is:

1. In valve actuating mechanism, the combination with a poppet valve having a stem, of a fixed member having an arcuate portion disposed adjacent and to one side of said valve, said arcuate portion being struck from a center displaced slightly from the center line of the valve stem on the other side thereof, a movable member having an arcuate portion rolling on the arcuate portion of said fixed member and having a radius substantially one-half that of the arcuate portion of the fixed member, and a curved surface bearing on the end of the valve stem, the center of said curved surface lying approximately on an extension of the arc defining the arcuate portion of the movable member, said curved surface having a radius of curvature such that when the movable member rolls on the fixed member the locus of the point of contact of said curved surface and valve stem passes approximately through the center from which the arcuate portion of the fixed member is struck.

2. In a mechanical movement, the combination with a movable driven element, of means constraining said driven element to move in a straight line, a fixed arcuate track, and a member having an arcuate portion of one half the radius of said arcuate track adapted to roll on the latter, and an arcuate bearing surface on said member having a center lying on an extension of the arc defining said arcuate portion for driving engagement with said driven element, the center from which said arcuate track is struck lying approximately in the locus of the point of engagement between said member and said driven element.

3. In a mechanical movement, the combination with a movable driven element, of means constraining said element to move in a straight line, a driving element having a convexly curved bearing surface engaging said driven element, a fixed element having a concave circular bearing portion, said driving element having a convex circular bearing portion of half the radius of said last named portion rolling thereon, the point of engagement between said driving and driven elements being located closely adjacent the extension of the arc defining the circular bearing portion of said driving element.

4. In valve actuating mechanism, the combination with a poppet valve, of a fixed member having an arcuate portion disposed adjacent and to one side of said valve, a movable member having an arcuate portion adapted to roll on the arcuate portion of said fixed member and having a valve engaging portion, said valve engaging portion being disposed in proximity to an extension of the curve defining the arcuate portion of said movable member, the arcuate portion of said fixed member having a radius substantially twice that of the arcuate portion of said movable member.

5. In a mechanical movement, the combination with a movable driven element, of means constraining said element to move in a straight line, a driving element having a convexly curved bearing surface engaging said driven element, a fixed element having a concave circular toothed portion, said driving element having a convex circular toothed portion of half the radius of said last named portion rolling thereon, the point of engagement between said driving and driven elements being located closely adjacent the extension of the arc defining the circular toothed portion of said driving element.

6. In valve actuating mechanism, the combination with a poppet valve, of means movable in a straight line and associated with said valve for actuating the same, a fixed member having a curved portion, and means including an element having a curved portion rocking on the curved portion of said member and a curved surface engaging said first named means, the radii of curvature of said portions being substantially in the ratio of 2:1, said curved surface being disposed in close proximity to the extended arc defining the curved portion of said element, whereby said element may engage said means with approximately pure rolling contact with said first named means for imparting movement to the latter.

HERBERT C. EDWARDS.